United States Patent [19]
Rutter

[11] Patent Number: 5,573,049
[45] Date of Patent: Nov. 12, 1996

[54] TIRE RIM SEPARATOR

[76] Inventor: Herman W. Rutter, 416 Harrison Ave., Lancaster, Ohio 43130

[21] Appl. No.: 456,301

[22] Filed: Jun. 1, 1995

[51] Int. Cl.$^6$ .............................................. B60C 25/122
[52] U.S. Cl. ........................... 157/1.21; 72/402; 100/232
[58] Field of Search ............................. 157/1.2, 1.21; 72/402; 100/35, 269 R, 232

[56] References Cited

U.S. PATENT DOCUMENTS

| | | | |
|---|---|---|---|
| 4,080,887 | 3/1978 | Larsen | 100/35 |
| 4,083,394 | 4/1978 | Heikkinen et al. | 157/1.21 |
| 4,804,031 | 2/1989 | Rouse et al. | 157/1.21 |
| 5,495,882 | 3/1996 | Trant | 157/1.21 |

*Primary Examiner*—James G. Smith

[57] ABSTRACT

A separator for removing a rim from a tire. The inventive device includes an engaging yoke for receiving an assembled tire and rim. A separating gate is positioned for reception of the yoke so as to force the assembled tire and rim through the gate. The gate is dimensioned so as to inwardly deform the tire and rim during biasing of the assembled wheel therethrough such that the rim is dropped from the tire subsequent to passing through the gate.

15 Claims, 4 Drawing Sheets

TIRE RIM SEPARATOR

BACKGROUND OF THE INVENTION

1. Field of the Invention

The present invention relates to tire handling devices and more particularly pertains to a tire rim separator for removing a rim from a tire.

2. Description of the Prior Art

The use of tire handling devices is known in the prior art. More specifically, tire handling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art tire handling devices include U.S. Pat. Nos. 4,355,674; 5,191,934; 3,937,265; 4,721,145; 3,701,375; and 3,807,478.

While these devices fulfill their respective, particular objectives and requirements, the aforementioned patents do not disclose a tire rim separator for removing a rim from a tire which includes an engaging yoke for receiving an assembled tire and rim, and a separating gate positioned for reception of the yoke so as to force the assembled tire and rim through the gate, wherein the gate is dimensioned so as to inwardly deform the tire and rim during biasing of the assembled wheel therethrough such that the rim is dropped from the tire subsequent to passing through the gate.

In these respects, the tire rim separator according to the present invention substantially departs from the conventional concepts and designs of the prior art, and in so doing provides an apparatus primarily developed for the purpose of removing a rim from a tire.

SUMMARY OF THE INVENTION

In view of the foregoing disadvantages inherent in the known types of tire handling devices now present in the prior art, the present invention provides a new tire rim separator construction wherein the same can be utilized for removing a rim from a tire. As such, the general purpose of the present invention, which will be described subsequently in greater detail, is to provide a new tire rim separator apparatus and method which has many of the advantages of the rim handling devices mentioned heretofore and many novel features that result in a tire rim separator which is not anticipated, rendered obvious, suggested, or even implied by any of the prior art tire handling devices, either alone or in any combination thereof.

To attain this, the present invention generally comprises a separator for removing a rim from a tire. The inventive device includes an engaging yoke for receiving an assembled tire and rim. A separating gate is positioned for reception of the yoke so as to force the assembled tire and rim through the gate. The gate is dimensioned so as to inwardly deform the tire and rim during biasing of the assembled wheel therethrough such that the rim is dropped from the tire subsequent to passing through the gate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire rim separator apparatus and method which has many of the advantages of the tire handling devices mentioned heretofore and many novel features that result in a tire rim separator which is not anticipated, rendered obvious, suggested, or even implied by any of the prior art tire handling devices, either alone or in any combination thereof.

It is another object of the present invention to provide a new tire rim separator which may be easily and efficiently manufactured and marketed.

It is a further object of the present invention to provide a new tire rim separator which is of a durable and reliable construction.

An even further object of the present invention is to provide a new tire rim separator which is susceptible of a low cost of manufacture with regard to both materials and labor, and which accordingly is then susceptible of low prices of sale to the consuming public, thereby making such tire rim separators economically available to the buying public.

Still yet another object of the present invention is to provide a new tire rim separator which provides in the apparatuses and methods of the prior art some of the advantages thereof, while simultaneously overcoming some of the disadvantages normally associated therewith.

Still another object of the present invention is to provide a new tire rim separator for removing a rim from a tire.

Yet another object of the present invention is to provide a new tire rim separator which includes an engaging yoke for receiving an assembled tire and rim, and a separating gate positioned for reception of the yoke so as to force the assembled tire and rim through the gate, wherein the gate is dimensioned so as to inwardly deform the tire and rim during biasing of the assembled wheel therethrough such that the rim is dropped from the tire subsequent to passing through the gate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
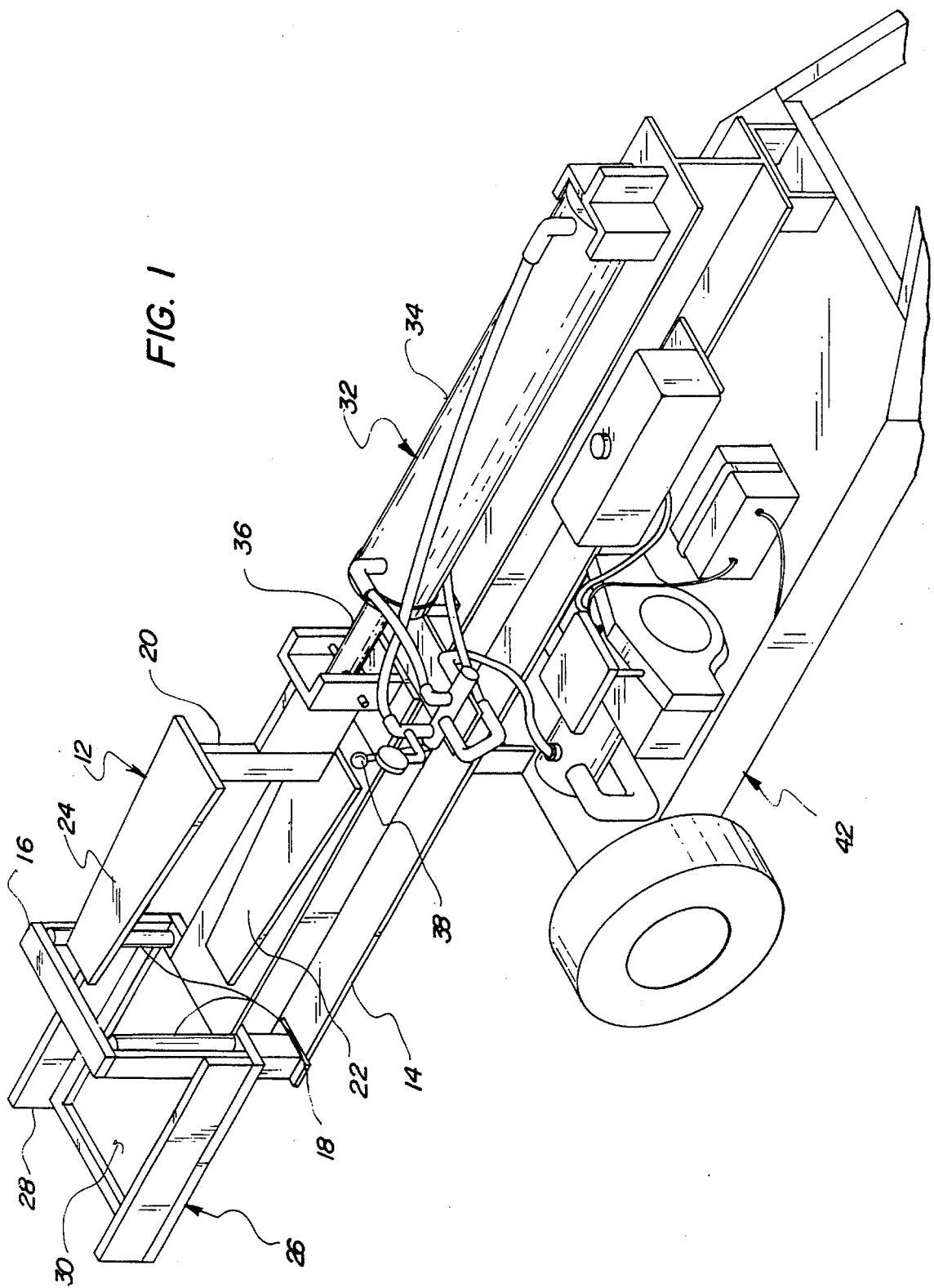
FIG. 1 is an isometric view of the present invention.
Figure 2:
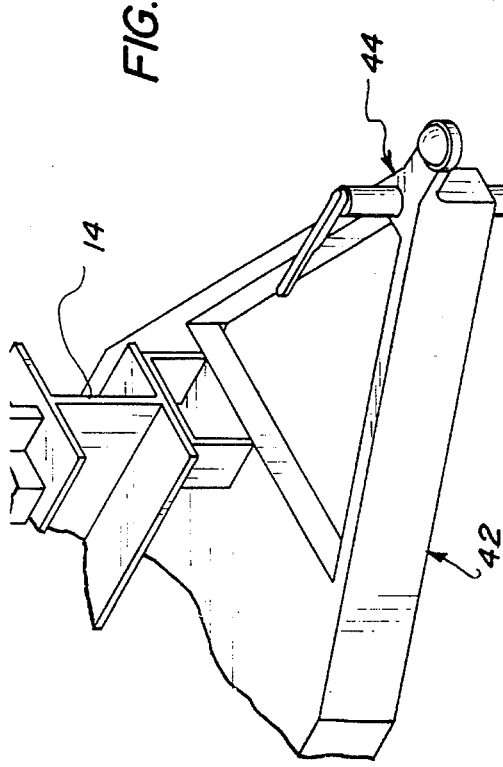
FIG. 2 is an enlarged isometric illustration of a portion of the present invention.
Figure 3:
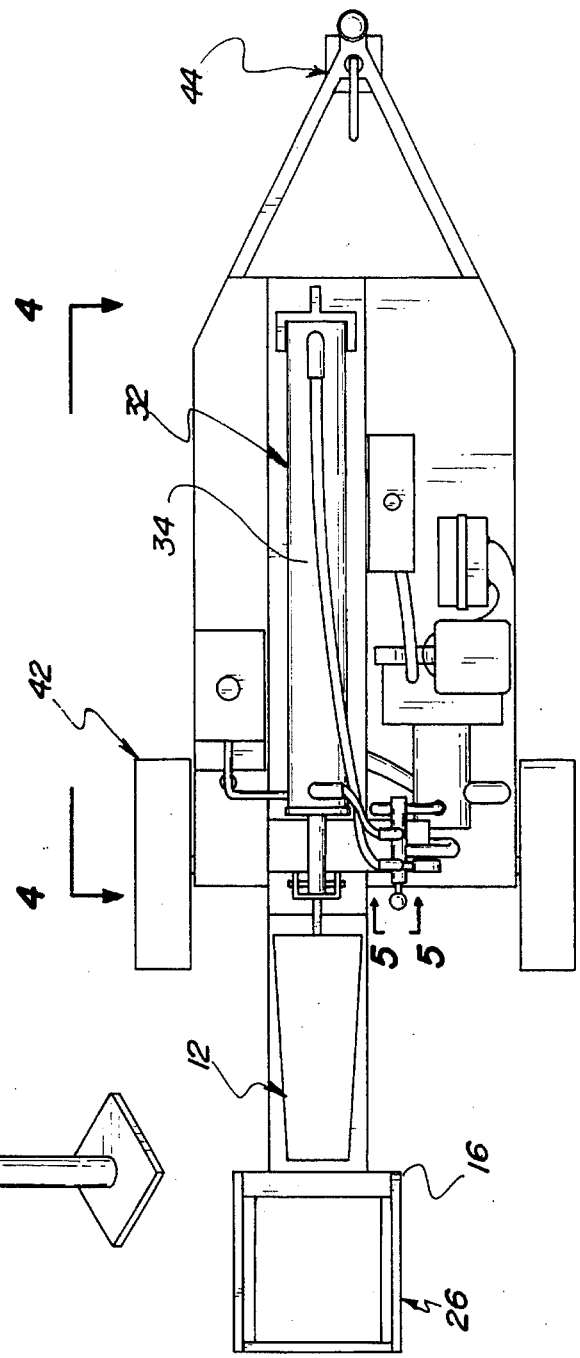
FIG. 3 is a top plan view of the invention.
Figure 4:
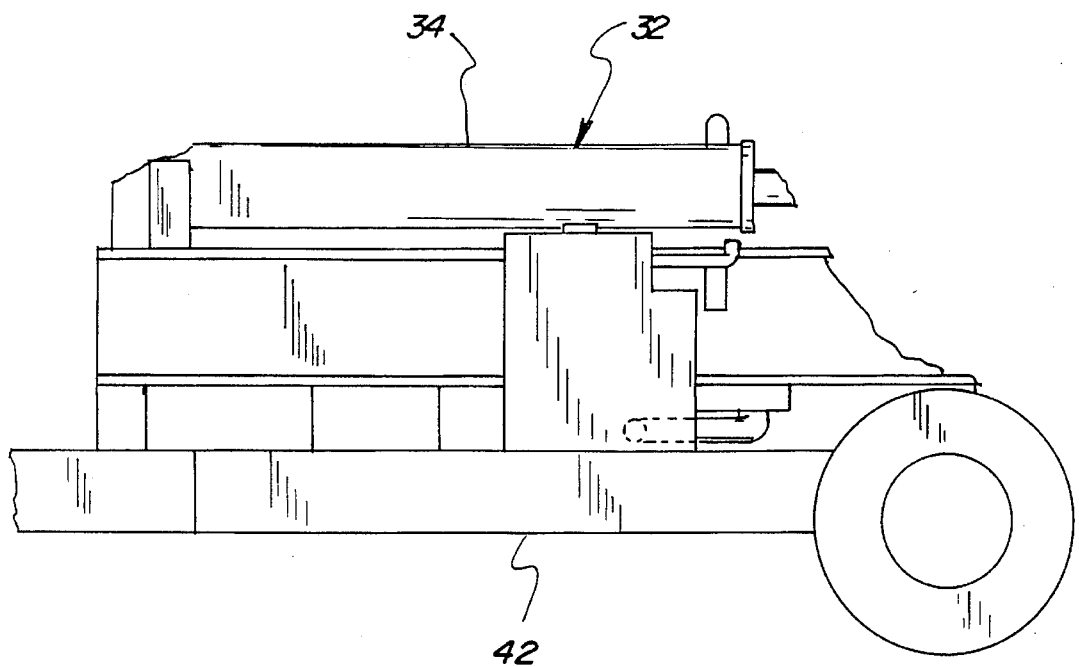
FIG. 4 is a side elevation view taken from line 4—4 of FIG. 3.

With reference now to the drawings, and in particular to FIGS. 1–7 thereof, a new tire rim separator embodying the principles and concepts of the present invention and generally designated by the reference numeral 10 will be described.

More specifically, it will be noted that the tire rim separator 10 comprises an engaging yoke 12 for receiving or engaging an assembled tire and rim. The engaging yoke 12 is movably, mounted relative to an elongated rail 14 by rollers, slide bearings, or the like. A separating gate 16 is secured to an end of the elongated rail 14 and positioned so as to receive the engaging yoke 12 therethrough during reciprocation of the engaging yoke relative to the elongated rail. By this structure, a placement of an assembled tire and rim within the engaging yoke 12 and a forcing of such assembled tire and rim through the separating gate 16 will effect diametrical compression of the tire and rim, whereby the tire resiliently expands subsequent to passing through the separating gate 16, with the rim maintaining the compressed shape and therefore falling from the tire.

Figure 6:
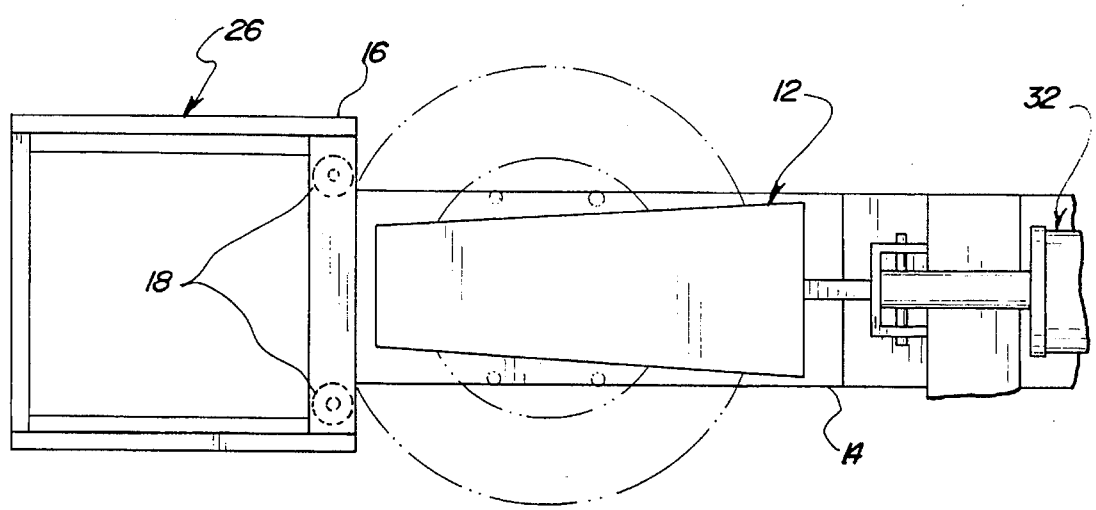
FIG. 6 is a top plan view of the invention in use.
Figure 7:
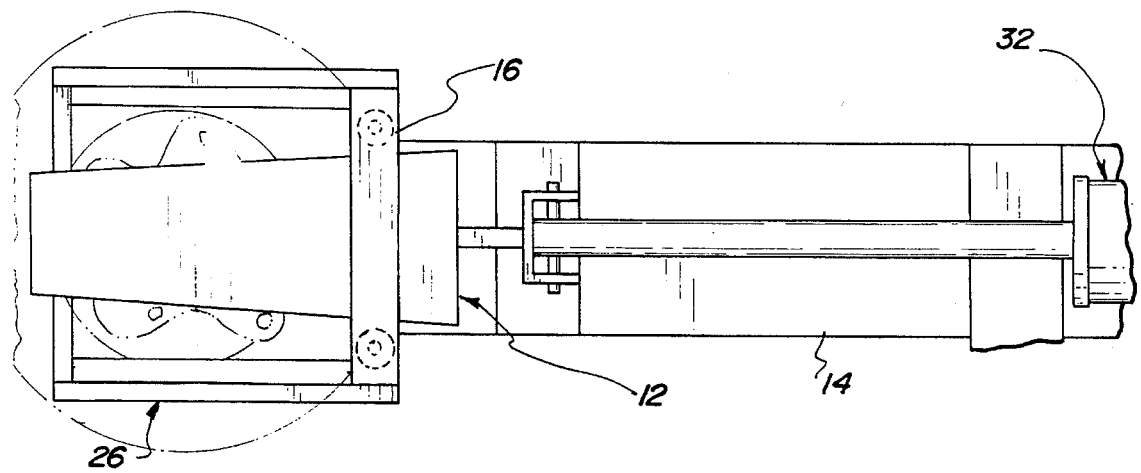
FIG. 7 is a further top plan view of the invention in use.

As best illustrated in FIGS. 1, 6, and 7, it can be shown that the separating gate 16 according to the present invention 10 preferably includes a pair of spaced vertical rollers 18 which are rotatably mounted within the separating gate. The vertical rollers 18 are spaced from one another a distance substantially less than a diameter of the rim to be separated. By this structure, a forcing of the rim and tire through the separating gate 16 will cause the spaced vertical rollers 18 to engage opposed sides of the assembled tire and rim so as to inwardly deform the tire and rim during passing thereof through the separating gate. Because a rim to be separated is typically constructed of a ductile material such as steel, the deformed shape of the rim will be retained, with the tire resiliently expanding back into its original circular shape so as to permit ease of separation of the rim from the tire.

With continuing reference to FIGS. 1, 6, and 7, it can be shown that the engaging yoke 12 according to tire present invention 10 preferably comprises a vertical stanchion 20 extending substantially parallel to the spaced vertical rollers 18 and positioned for reciprocation along the elongated rail 14 relative to the rollers. The engaging yoke 12 may further comprise a lower plate 22 coupled to a lower end of the vertical stanchion 20 proximal to the elongated rail 14, and an upper plate 24 coupled to an upper end of the vertical stanchion 20 remote from the elongated rail. The plates 22 and 24 are preferably positioned in a substantially spaced and parallel orientation so as to receive the assembled rim and wheel therebetween. It should be noted that the engaging yoke 12 can be constructed without the upper plates 22 and 24 if so desired. By this structure, the vertical stanchion 20 of the engaging yoke 12 engages an exterior of the assembled tire and rim so as to force the assembled tire and rim through the separating gate 16 during movement of the vertical stanchion 20 towards the separating gate. The vertical stanchion 20, in cooperation with the spaced vertical rollers 18, operates to initially radially inwardly deform the rim, with the rollers 18 further radially inwardly deforming the rim into a substantially U-shaped or V-shaped configuration. Such configuration or deformation of the rim results in a decrease in the rim's diameter, thereby allowing such rim to be easily separated from the associated tire.

To facilitate a gravitationally induced separation of the compacted rim from the tire, a retaining means 26 can be provided for use with the present invention 10. To this end, the retaining means 26 comprises a container 28 mounted to the separating gate 16 so as to receive a tire and rim positioned through the separating gate by the engaging yoke 12. The container 28 is provided with an aperture 30 directed therethrough which permits the compacted rim to fall from the tire when the tire resides within the container 28. By this structure, the engaging yoke 12 can be utilized to bias the assembled tire and rim through the separating gate 16 and into the container 28 such that the compacted rim simply falls from the tire through the aperture 30 in the container.

Figure 5:
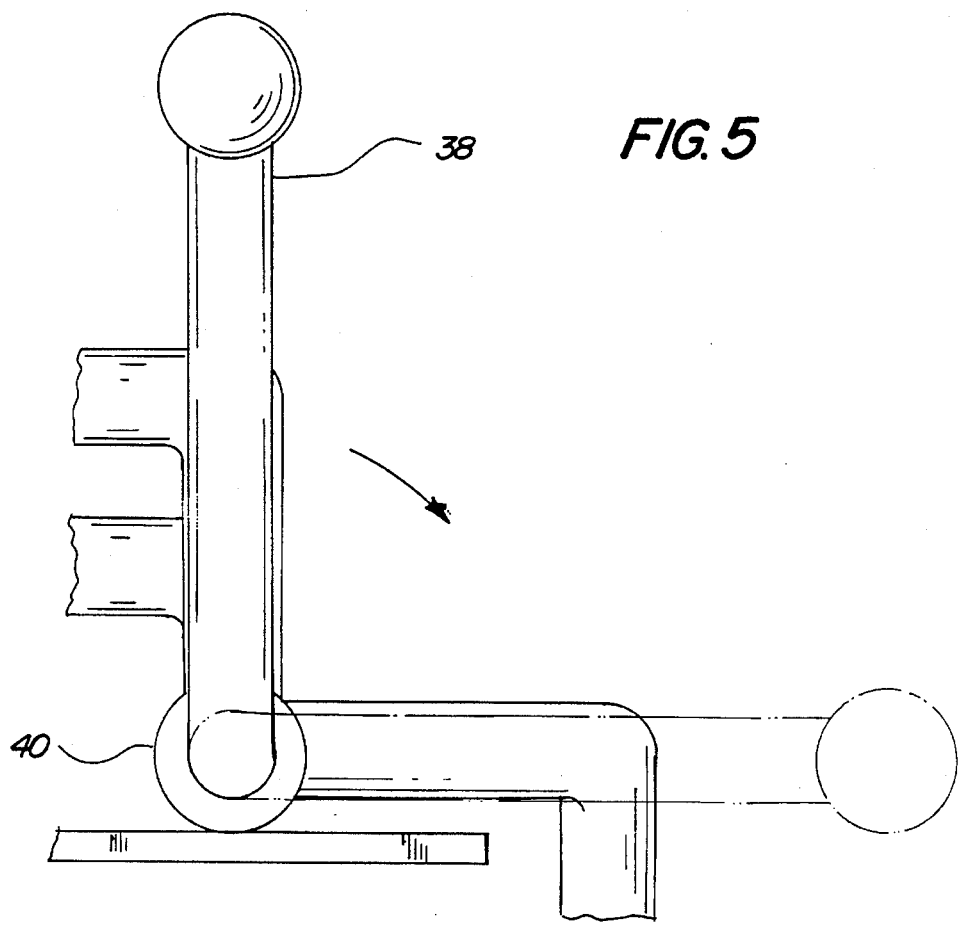
FIG. 5 is an enlarged elevation view of an actuating lever comprising a portion of the present invention.

To effect powered reciprocation of the engaging yoke 12 towards or through the separating gate 16, the present invention 10 may further comprise a biasing means 32 for advancing the engaging yoke 12 along the elongated rail 14 through the separating gate 16. To this end, the biasing means 32 preferably comprises a hydraulic cylinder 34 mounted to the elongated rail 14 and including a reciprocating plunger 36 coupled to the vertical stanchion 20 of the engaging yoke 12. A pressurized hydraulic fluid supply means in the form of an engine having a battery and a gas tank coupled to a hydraulic fluid pump provides pressurized hydraulic fluid to the hydraulic cylinder 34 so as to advance the plunger 36 in a conventionally known manner. An actuating lever 38 is coupled to a valve 40, as shown in FIG. 5. The valve 40 is positioned in fluid communication with the hydraulic cylinder 34 so as to effect selective operation of the hydraulic cylinder as desired.

As shown in FIGS. 1 through 4, the present invention 10 may be advantageously mounted upon a trailer 42 for affording portability of the present invention 10. To this end, a trailer hitch 44 is secured to a front of the trailer 42 so as to facilitate pulling of the present invention behind a tow vehicle.

In use, the tire rim separator 10 according to tire present invention can be easily utilized to effect ease of separation of a rim from a tire, whereby tire rim and tire may be separately submitted for recycling or salvage as desired by an end user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire rim separator comprising:
   an elongated rim;
   a separating gate secured to an end of the elongated rail, the separating gate includes a pair of spaced vertical rollers rotatably mounted within the separating gate, the vertical rollers being spaced from one another a distance substantially less than a diameter of a rim to be separated from a tire such that a forcing of the rim and tire through the separating gate will cause the spaced vertical rollers to engage opposed sides of an assembled tire and rim so as to inwardly deform the tire and rim during passing thereof through the separating gate;
   means for engaging the assemble tire and rim such that the assembled tire and rim can be forced through the separating gate to effect diametrical compression of the tire and rim, whereby the rim resiliently expands subsequently to passing through the separating gate, with the rim maintaining the compressed shape.

2. The tire rim separator of claim 1, wherein the means for engaging an assembled tire and rim comprises an engaging yoke movably mounted relative to the elongated rail.

3. The tire rim separator of claim 2, wherein the engaging yoke comprises a vertical stanchion extending substantially parallel to the spaced vertical rollers and positioned for reciprocation relative to the rollers along the elongated rail.

4. The tire rim separator of claim 3, wherein the engaging yoke further comprises a lower plate coupled to a lower end of the vertical stanchion proximal to the elongated rail, and an upper plate coupled to an upper end of the vertical stanchion remote from the elongated rail, the plates being positioned in a substantially spaced and parallel orientation so as to receive an assembled tire and wheel therebetween.

5. The tire rim separator of claim 4, and further comprising a retaining means for facilitating a gravitationally induced separation of a compacted rim from a tire.

6. The tire rim separator of claim 5, wherein the retaining means comprises a container mounted relative to the separating gate so as to receive a tire and rim positioned through the separating gate by the engaging yoke, the container including an aperture directed therethrough which permits a compacted rim to fall from the tire when the tire resides within the container.

7. The tire rim separator of claim 6, and further comprising a biasing means for effecting powered reciprocation of the engaging yoke relative to the separating gate.

8. The tire rim separator of claim 7, wherein the biasing means comprises a hydraulic cylinder mounted relative to the elongated rail and including a reciprocating plunger coupled to the vertical stanchion of the engaging yoke; and a pressurized hydraulic fluid supply means for providing pressurized hydraulic fluid to the hydraulic cylinder so as to advance the plunger relative to the cylinder.

9. A tire rim separator comprising:
   an elongated rail;
   an engaging yolk for engaging an assembled tire and rim, the engaging yoke being removably mounted relative to the elongated rail;
   a separating gate secured to an end of the elongated rail and positioned so as to receive the engaging yolk during reciprocation of the engaging yolk relative to the elongated rail such that a placement of an assembled tire and rim within the engaging yoke and a forcing of the assembled tire and rim through the separating gate will effect diametrical compression of the tire and rim, whereby the tire resiliently expands subsequent to passing through the separating gate, with the rim maintaining the compressed shape, the separating gate includes a pair of spaced vertical rollers rotatably mounted within the separating gate, the vertical rollers being spaced from one another a distance substantially less than a diameter of a rim to be separated from a tire such that a forcing of the rim and tire through the separating gate will cause the spaced vertical rollers to engage opposed sides of the assembled tire and rim so as to inwardly deform the tire and rim during passing thereof through the separating gate.

10. The tire rim separator of claim 9, wherein the engaging yoke comprises a vertical stanchion extending substantially parallel to the spaced vertical rollers and positioned for reciprocation relative to the rollers along the elongated rail.

11. The tire rim separator of claim 10, wherein the engaging yoke further comprises a lower plate coupled to a lower end of the vertical stanchion proximal to the elongated rail, and an upper plate coupled to an upper end of the vertical stanchion remote from the elongated rail, the plates being positioned in a substantially spaced and parallel orientation so as to receive an assembled tire and wheel therebetween.

12. The tire rim separator of claim 11, and further comprising a retaining means for facilitating a gravitationally induced separation of a compacted rim from a tire.

13. The tire rim separator of claim 12, wherein the retaining means comprises a container mounted relative to the separating gate so as to receive a tire and rim positioned through the separating gate by the engaging yoke, the container including an aperture directed therethrough which permits a compacted rim to fall from the tire when the tire resides within the container.

14. The tire rim separator of claim 13, and further comprising a biasing means for effecting powered reciprocation of the engaging yoke relative to the separating gate.

15. The tire rim separator of claim 14, wherein the biasing means comprises a hydraulic cylinder mounted relative to the elongated rail and including a reciprocating plunger coupled to the vertical stanchion of the engaging yoke; and a pressurized hydraulic fluid supply means for providing pressurized hydraulic fluid to the hydraulic cylinder so as to advance the plunger relative to the cylinder.

* * * * *